US006957061B1

(12) United States Patent
Wright

(10) Patent No.: US 6,957,061 B1
(45) Date of Patent: Oct. 18, 2005

(54) USER AUTHENTICATION IN A MOBILE COMMUNICATIONS NETWORK

(75) Inventor: Timothy James Wright, Reading (GB)

(73) Assignee: Vodafone Limted, Berkshire (GB)

( * ) Notice: Subject to any disclaimer, the term of this patent is extended or adjusted under 35 U.S.C. 154(b) by 431 days.

(21) Appl. No.: 09/714,404

(22) Filed: Nov. 16, 2000

(30) Foreign Application Priority Data

Nov. 18, 1999 (GB) .................................... 9927334

(51) Int. Cl.$^7$ .............................................. H04M 1/66
(52) U.S. Cl. ..................... 455/411; 455/410; 455/418; 455/558; 455/432.1; 235/482; 235/380
(58) Field of Search ..................... 455/411, 418, 419, 455/420, 550.1, 552.1, 556.1, 410, 558, 432.1, 455/432.3, 435.1; 235/380, 382, 482, 487, 235/480; 913/170

(56) References Cited

U.S. PATENT DOCUMENTS

| 4,897,875 A | 1/1990 | Pollard et al. |
| 5,471,532 A | 11/1995 | Gardeck et al. |
| 6,014,558 A | 1/2000 | Thomas |
| 6,216,014 B1 * | 4/2001 | Proust et al. ................ 455/558 |
| 6,230,002 B1 * | 5/2001 | Floden et al. ............... 455/411 |
| 6,321,094 B1 * | 11/2001 | Hayashi et al. ............. 455/517 |
| 6,397,056 B1 * | 5/2002 | Bugnon et al. ............. 455/411 |
| 6,406,175 B1 * | 6/2002 | Marino ........................ 366/130 |
| 6,442,406 B1 * | 8/2002 | Harris et al. ................. 455/565 |
| 6,539,224 B2 * | 3/2003 | Schmitz et al. ........... 455/435.1 |
| 6,542,735 B1 * | 4/2003 | Carley .......................... 455/420 |
| 6,543,686 B1 * | 4/2003 | Ritter .......................... 235/380 |
| 6,546,240 B2 * | 4/2003 | Alos et al. ................... 455/411 |
| 6,591,095 B1 * | 7/2003 | Palaniswamy et al. ...... 455/411 |
| 2001/0044296 A1 * | 11/2001 | Mizikovsky ................. 455/411 |
| 2001/0046850 A1 * | 11/2001 | Blanke et al. ............... 455/411 |
| 2002/0068548 A1 * | 6/2002 | Schroderus et al. ........ 455/411 |

FOREIGN PATENT DOCUMENTS

| GB | 2 279 541 | 1/1995 |
| WO | WO 92/02087 | 2/1992 |

* cited by examiner

Primary Examiner—Rafael Perez-Gutierrez
Assistant Examiner—Khawar Iqbal
(74) Attorney, Agent, or Firm—Leydig, Voit & Mayer, Ltd.

(57) ABSTRACT

A method of authenticating mobile user equipment in a mobile telecommunications network comprising the steps of receiving an authentication element from a serving network (SN) to which the user equipment is not directly subscribed, extracting the authentication management field (AMF) from the authentication element, generating in response at least to a predetermined value of the authentication management field (AMF), a key set identifier (KSI), and passing the key set identifier (KSI) to the serving network (SN).

15 Claims, 1 Drawing Sheet

USER AUTHENTICATION IN A MOBILE COMMUNICATIONS NETWORK

BACKGROUND TO THE INVENTION

This invention relates to a method and apparatus for authenticating mobile user equipment in a mobile telecommunications network.

SUMMARY OF THE INVENTION

In accordance with a first aspect of the invention, there is provided a method of authenticating mobile user equipment in a mobile telecommunications network comprising the steps of passing an authentication element forming at least part of an authentication vector, from a serving network to mobile user equipment, deciding in the user equipment based at least in part on the value of a predetermined field contained in the authentication element, when to generate a termination message, and passing the termination message from the mobile user equipment to the serving network which message contains a value indicating that the serving network must obtain a further authentication vector before allowing the user equipment to make further calls.

In accordance with a second aspect of the invention, there is provided a method of authenticating mobile user equipment in a mobile telecommunications network comprising the steps of requesting service from a serving network to which the user equipment is not directly subscribed, passing the request for service from the serving network to a home operator network to which the user equipment is directly subscribed, generating an authentication vector in the home operator network which includes an authentication management field, passing the authentication vector from the home operator network to the serving network, passing an authentication element forming at least part of the authentication vector from the serving network to the user equipment, extracting in the user equipment an authentication management field from the authentication element, generating in response at least to a predetermined value of the authentication management field, a predetermined key set identifier, and passing the key set identifier to the serving network.

In accordance with a third aspect of the invention, there is provided mobile user equipment for use in a mobile telecommunications network including means for receiving from a serving network, an authentication element forming at least part of an authentication vector, decision means for deciding in the user equipment based at least in part on the value of a predetermined field contained in the authentication element, when to generate a termination message, and means for passing the termination message from the mobile user equipment to the serving network which message contains a value indicating that the serving network must obtain a further authentication vector before allowing the user equipment to make further calls.

Embodiments of networks and mobile user equipment in accordance with the invention will now be described by way of example with reference to the drawings in which:

DESCRIPTION OF THE PREFERRED EMBODIMENTS

The invention described below permits a 3GPP operator to use the 3GPP authentication management field AMF to direct a subscriber of that operator to ensure that a particular 3GPP authentication vector for that subscriber (from that operator) is used for only one call in a particular serving network. Alternatively the authentication vector may be used only for a predetermined time period, for a predetermined number of calls or for a predetermined total call duration (which may span more than one call) after issuance by the operator or receipt by the user equipment. The invention is applicable, for example, to 3GPP, 3GPP2, and IS-136 networks and to ANSI-41 networks which adopt the TR45 Enhanced Subscriber Authentication (ESA).

One possibility which has been considered is for a serving network (i.e. the network that a user is making calls with) to be given instructions on how the authentication vector should be used. However, this would require the home operator or home environment (i.e. the operator with which the user has a subscription) to rely on the competence of the serving network to ensure that the instructions are correctly followed. Furthermore, assuming that the instructions are passed electronically, new signalling messages would need to be standardised and new procedures in the serving network visitor location registers (VLR's) would need to be devised, standardised and implemented to ensure that the VLR's respond correctly to the new signalling messages.

Figure 1:
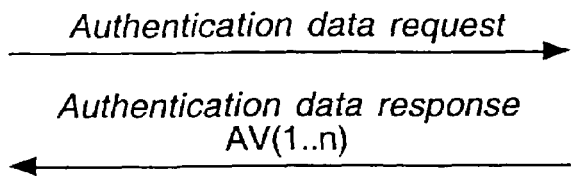
FIG. 1 is a schematic diagram of the flow of authentication information between a serving network and a home environment.

With reference to FIG. 1, an authentication vector is transmitted from the home operator HE to the serving network SN in response to a so called "authentication data request" from the serving network.

An authentication vector contains the following parameters

RAND which is a random challenge generated by the home operator,

XRES which is the expected user response to RAND which is pre-computed by the home operator, CK which is a cipher key, IK which is an integrity key, and a network user authentication string AUTN.

The network to user authentication string AUTN consists of the sequence number for the vector (SQN) which is concealed with an anonymity key (AK), an authentication management field AMF (discussed in detail below), and a message authentication code MAC-A which allows for network to user authentication.

Having received an authentication vector from the home environment, the serving network passes the RAND and AUTN portions of the vector to the user equipment.

Figure 2:
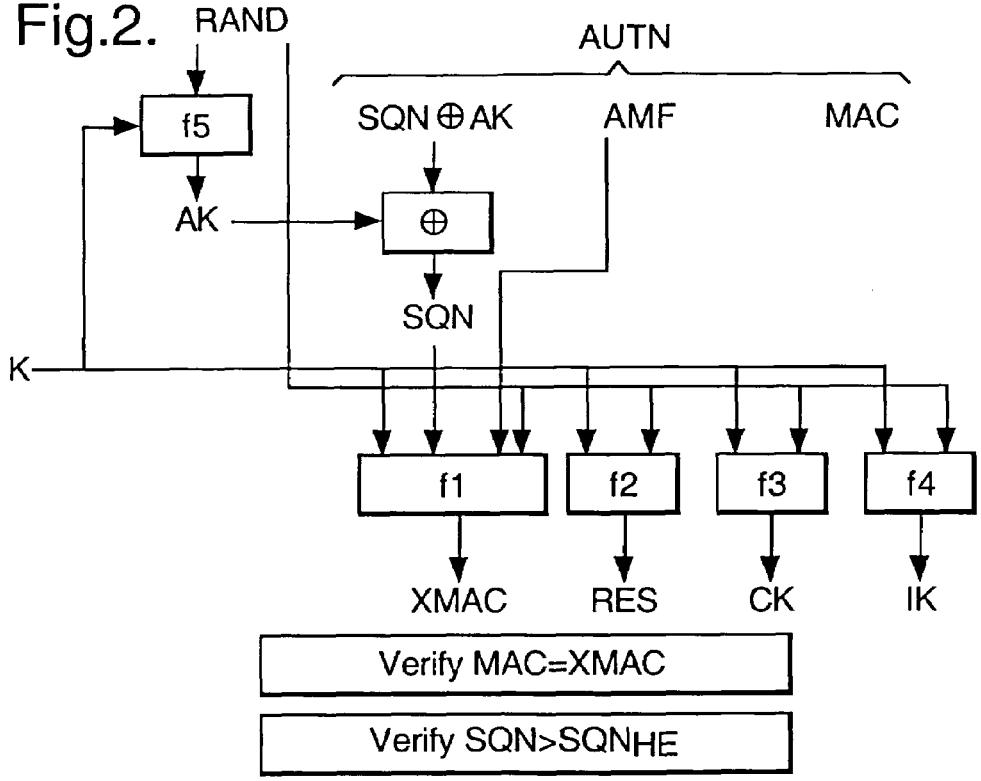
FIG. 2 is a schematic block diagram of the processing of an authentication vector by mobile user equipment.

With reference to FIG. 2, the RAND and AUTN portions are processed by the mobile user equipment. The user equipment processes RAND using a predetermined algorithm f5 which takes as its input also a long term secret key K. This produces the anonymity key AK which can be used to reveal the sequence number SQN.

SQN is then fed into a predetermined algorithm f1 along with RAND and the long term secret key K. This generates XMAC (the expected message authentication code). This is compared with MAC-A and should be equal to MAC-A.

If XMAC is correct, the user equipment then checks that the sequence number SQN which has been generated is greater than $SQN_{he}$; which is the SQN attached to the last valid RAND/AUTN combination received from the home environment. This ensures that an authentication vector can only be used once.

If both MAC-A and SQN in the network to user authentication string AUTN pass the above test, then the AUTN is considered valid. The user equipment then processes RAND by applying the long term secret key K via algorithms f2, f3 and f4. This generates the values of RES, IK and CK.

The response (RES) is sent to the serving network which responds with a key set identifier (KSI). The user SIM assigns or tags the generated CK and IK values with the KSI given by the serving network. As described below, the user equipment then passes the KSI to the SN with each request for service.

As noted above, it may be difficult for the home operator to ensure that correct authentication procedures are carried out by the serving network. Described below, are several techniques (which may be selected by sending appropriate instructions via the authentication management field of the authentication vector) which limit the lifetime of the authentication vector thereby requiring the serving network to request a new authentication vector from the home operator.

Figure 3:
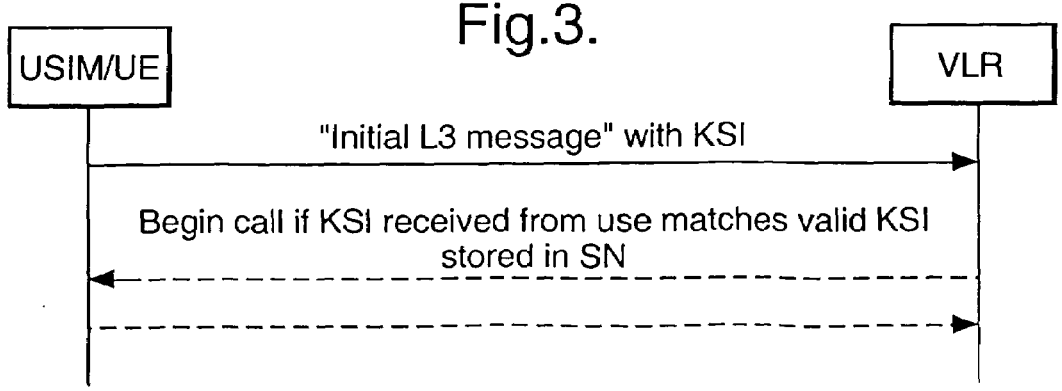
FIG. 3 is a schematic block diagram showing the flow of key set identification information between a mobile user and the visitor location register of a serving network.

With reference to FIG. 3, once the process shown in FIG. 2 is completed, the user equipment may initiate calls via the serving network using the same KSI without requiring a new vector to be requested by the serving network. Initially, the user equipment sends its current KSI in its first layer three message (this being the message that requests a particular service from the serving network). The serving network checks the KSI received with the message and if it is valid, continues to process the service request. Ciphering and integrity protection are performed using the CK and IK indicated by the KSI.

The user equipment is able to select a KSI value which indicates to the serving network that the user does not have a valid CK or IK at the next service request (for example the next call). Thus, without modifying any of the signalling messages between the home operator and serving network or producing any new procedures for the serving network VLR, it is possible for the user equipment to control the lifetime of the authentication vector.

In the first technique, the authentication management field is used to instruct the user equipment to always issue a KSI which causes a new vector to be requested when service is next requested from the serving network. The effect of this is that an authentication vector is requested for every call made by the user equipment in the serving network. This ensures that full authentication occurs for every call and also means that the home operator is notified of every call made by the user equipment. This means that the home operator has control over the security of the use of the user equipment in the serving network.

In an alternative approach, the user equipment can allow the authentication vector to be used for a predetermined time period, a predetermined number of calls or a predetermined total call duration (which may span more than one call). These parameters may be monitored by the user equipment using appropriate timers, accumulators and counters. Before requesting service, the mobile user equipment determines whether the authentication vector should still be valid and issues either the KSI given by the serving network (if no new authentication vector is required) or a special KSI which forces the serving network to request a new authentication vector when the next service request is made.

Thus in the first technique above, the AMF may be used to ensure that only one call can be made with the authentication vector containing that AMF. This provides maximum security for the home operator. In the alternative techniques, the risk to the home operator of abuse of the network is reduced because there is choice of a maximum time limit of service, maximum call duration and/or maximum number of calls available with a particular authentication vector.

It will be appreciated that the user equipment may be arranged to implement one, all or a selection of the above techniques, each selected by a particular value of the AMF. Also, the user equipment may implement a combination of the techniques such as forcing a new vector to be requested if a predetermined number of calls have been made or a predetermined time period has expired.

I claim:

1. A method of allowing a home mobile telecommunications network to authenticate mobile user equipment located in an area covered by a serving mobile telecommunications network, wherein the mobile user equipment has a subscription with the home mobile telecommunications network, the mobile user equipment is adapted to make and receive telephone calls when within an area covered by the home mobile telecommunications network by wireless communication between the mobile user equipment and the home mobile telecommunications network, and the home mobile telecommunications network is operable to generate authentication vectors for enabling the mobile user equipment to obtain an identifier having a value from the serving network, which identifier is transmitted from the mobile user equipment to the serving network to allow the mobile user equipment to make calls by wireless communication between the mobile user equipment and the serving mobile telecommunications network when within the area covered by the serving mobile telecommunications network, the method comprising the steps of:

passing an authentication element forming at least part of an authentication vector, from the serving mobile telecommunications network to the mobile user equipment, deciding in the user equipment, based at least in part on the value of a predetermined field contained in the authentication element, when to generate a termination message, and passing the termination message from the mobile user equipment to the serving mobile telecommunications network, which message comprises said identifier but with a second value different from ad value, and which second value indicates that the serving mobile telecommunications network must obtain a further authentication vector from the home mobile telecommunications network before allowing the user equipment to make further calls.

2. A method according to claim 1, wherein the termination message, is a predetermined key set identity value.

3. A method according to claim 1, wherein the predetermined field is an authentication management field.

4. A method according to claim 1, wherein the said decision is taken based on the total call duration which has accumulated since the authentication element containing the predetermined field was first received by the mobile user equipment.

5. A method according to claim 1, wherein the said decision is taken based on the time elapsed since the authentication element containing the predetermined field was first received by the mobile user equipment.

6. A method according to claim 1, wherein the said decision is taken based on the total number of calls made since the authentication element containing the predetermined field was first received by the mobile user equipment.

7. A SIM for mobile user equipment embodying the method steps of claim 1.

8. A method of allowing a home mobile telecommunications network to authenticate a mobile user equipment located in an area covered by a serving mobile telecommunications networks, wherein the mobile user equipment has a subscription with the home mobile telecommunications network, the mobile user equipment is adapted to make and receive telephone calls within an area covered by the home mobile telecommunications network by wireless communication between the mobile user equipment and the home mobile telecommunications network and the home mobile telecommunications network is operable to genre authentication vectors for enabling the mobile user equipment to obtain a key set identifier having a value from the serving network, which key set identifier is transmitted from the mobile user equipment to the serving network to allow the mobile user equipment to make calls by wireless communication between the mobile user equipment and the serving mobile telecommunications network, the method comprising the steps of:

requesting service from the serving network to which the user equipment is not directly subscribed, passing the request for service from the serving network to a home operator network to which the user equipment is directly subscribed, generating an authentication vector in the home operator network which includes an authentication management field, passing the authentication management field, contained in an authentication vector, from the home operator network to the serving network, passing an authentication element forming at least part of the authentication vector from the setting network to the user equipment, extracting in the user equipment the authentication management field from the authentication element, generating in response at least to a predetermined value of the authentication management field, the predetermined key set identifier, deciding in the usr equipment based at least in part on the value of the authentication management field contained in the authentication element, when to generate the key set identifier which has the value indicating that the serving network must obtain a further authentication vector before allowing the user equipment to make further calls, and passing the key set identifier to the serving network.

9. A method according to claim 8, wherein the said decision is taken based on the total call duration which has accumulated since the authentication element containing the predetermined filed was first received by the mobile user equipment.

10. A method according to claim 8, wherein the said decision is taken based on the time elapsed since the authentication element containing the predetermined field was first received by the mobile user equipment.

11. A method according to claim 8, wherein the said decision is taken based on the total number of calls made since the authentication element containing the predetermined field was first received by the mobile user equipment.

12. Mobile user equipment for use in a servicing mobile telecommunications network when located in an area covered by a servicing mobile telecommunications network wherein the mobile user equipment has a subscription with the home mobile telecommunications network the mobile user equipment is adapted to make and receive telephone calls when within an area covered by the home mobile telecommunications network by wireless communication between the mobile user equipment and the home mobile telecommunication network, and the home mobile telecommunications rework is operable to generate authentication vector for enabling the mobile user equipment to obtain an identifier having a value from the serving network, which identifier is transmitted from the mobile user equipment to the serving network to allow the mobile user equipment to make calls by wireless communication between the mobile user equipment and the serving mobile telecommunications network, the mobile user equipment including:

means for receiving from the serving network an authentication element forming at least part of an authentication vector, decision means for deciding in the user equipment, based at least in part on the value of a predetermined field conned in the authentication element, when to generate a termination message, and means for passing the termination message from the mobile user equipment to the serving network which message comprises said identifier but with a second value different from said value, and which second value indicates that the serving network must obtain a further authentication vector from the home operator before allowing the user equipment to make fisher calls.

13. Mobile user equipment according to claim 12, including accumulator means for monitoring the total call duration which has accumulated since the authentication element containing the predetermined filed was first received by the mobile user equipment and providing a value representative of the said total call duration to the decision means.

14. Mobile user equipment according to claim 12, including timer means for measuring the time elapsed since the authentication element containing the predetermined field was first received by the mobile user equipment and providing a time value representative of the said elapsed time to the decision means.

15. Mobile user equipment according to claim 12, including counter means for containing the total number of cals made since the authentication element containing the predetermined field was first received by the mobile user equipment and providing a call number value representative of the said total call number to the decision means.

* * * * *